(12) United States Patent
Ishikawa

(10) Patent No.: US 6,289,131 B1
(45) Date of Patent: Sep. 11, 2001

(54) METHOD FOR ENCODING WAVELET COEFFICIENTS

(75) Inventor: Masaaki Ishikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/215,371

(22) Filed: Dec. 18, 1998

(30) Foreign Application Priority Data

Dec. 26, 1997 (JP) .................................................. 9-359518

(51) Int. Cl.$^7$ .................................................. G06K 9/36
(52) U.S. Cl. ............................................ 382/240; 382/232
(58) Field of Search ........................................... 382/232, 239, 382/240, 248, 263, 274, 398, 403, 404, 399, 397

(56) References Cited

U.S. PATENT DOCUMENTS

| | | | | |
|---|---|---|---|---|
| 5,315,670 | * | 5/1994 | Shapiro | 382/232 |
| 5,412,741 | * | 5/1995 | Shapiro | 382/232 |
| 5,563,960 | * | 10/1996 | Shapiro | 382/239 |
| 5,808,683 | | 9/1998 | Tong et al. | 348/398 |

FOREIGN PATENT DOCUMENTS

| | | |
|---|---|---|
| 8-186815 | 7/1996 | (JP) . |
| 9-182074 | 7/1997 | (JP) . |
| WO 93/17524 | 9/1993 | (WO) . |
| WO 97/16021 | 5/1997 | (WO) . |

OTHER PUBLICATIONS

Lervik et al; "Optimal Entropy Coding in Image Subband Coders"; IEEE 1994; pp. 390–394.

Jiro Kato, et al., "9.6kb/s Picture Coding Using Wavelet Transform", a thesis of the 1993 Institute of Electronics, Information and Communication Engineers (IEICE) Spring Conference, D–262, 7–23.

Mutsumi Ohta, "Wavelet Transform Coding for Picture (2) –A Scanning Method suitable for Wavelet Basis–", a thesis of the 1993 Institute of Electronics, Information and Communication Engineer (IEICE) Spring Conference, D–336, 7–46.

* cited by examiner

*Primary Examiner*—Jose L. Couso
*Assistant Examiner*—Duy M. Dang
(74) *Attorney, Agent, or Firm*—Dickstein Shapiro Morin & Oshinsky LLP

(57) ABSTRACT

A method for encoding wavelet coefficients can achieve a high compression ratio for image data. The image data is converted and quantized into coefficients by a two-dimensional wavelet transform and the coefficients having the same spatial position are collected to form a block. A layered quad-tree structure of the coefficients included in each block is defined with respect to each of a set of coefficients representing a vertical component, a set of coefficients representing a horizontal component and a set of coefficients representing a diagonal component. Each quad-tree structure has a root corresponding to a coefficient of a lowest frequency band. A zero tree of which all descendant nodes lack a significant coefficient is searched for, and positional information of the zero tree is encoded. The coefficients other than descendants of the zero-tree are scanned so as to form a one-dimensional coefficient string of the scanned coefficients. The one-dimensional coefficient string is encoded according to a two-dimensional encoding method using a run length of a zero run immediately preceding a significant coefficient and a significant coefficient.

7 Claims, 13 Drawing Sheets

\* : ROOT OF ZERO TREE
1~42 : ORDER OF SCANNING (-48,-96,80)
(-48,-48,0,0)
(-48,0,80,16)
(0,-16,0,0)
(-16,0,0,0)
EOS
(144,-16,-32,0)
(32,64,-16,-32)
(16,0,0,-16)
(0,16,0,0)
(0,16,16,0)
EOS

FIG.18

```
CLASS      CHILDREN
 (10)-(-48,-96,80)
  (6)-(-48,-48,0,0)
  (6)-(-48,0,80,16)
  (6)-(0,-16,0,0)
  (0)-(-16,0,0,0)
  (0)-EOS
  (7)-(144,-16,-32,0)
  (8)-(32,64,-16,-32)
  (5)-(16,0,0,-16)
  (6)-(0,16,0,0)
  (0)-(0,16,16,0)
  (7)-EOS
```

FIG.19

```
CLASS      CHILDREN
  (2)-(-48,-96,80)
  (1)-(-48,-48,0,0)
  (0)-(-48,0,80,16)
  (0)-(0,-16,0,0)
  (0)-(-16,0,0,0)
  (0)-EOS
  (1)-(144,-16,-32,0)
  (0)-(32,64,-16,-32)
  (0)-(16,0,0,-16)
  (0)-(0,16,0,0)
  (0)-(0,16,16,0)
  (1)-EOS
```

\* : POSITION OF EOS

FIG.21

NUMBER OF
CONSECUTIVE
FOUR COEFFICIENTS
SET TO ZERO    CHILDREN (0,-48,-96,80)
(0,-48,-48,0,0)
(0,-48,0,80,16)
(0,0,-16,0,0)
(0,-16,0,0,0)
(0,EOS)
(0,144,-16,-32,0)
(0,32,64,-16,-32)
(0,16,0,0,-16)
(0,0,16,0,0)
(0,0,16,16,0)
(1,16,0,0,0)
(0,EOS)
(0,EOS)
(0,EOS)

METHOD FOR ENCODING WAVELET COEFFICIENTS

BACKGROUND OF THE INVENTION

1. Field of the Invention

The present invention generally relates to a method for compressing image data such as data of a natural image and, more particularly, to a method for encoding image data such as a static image or a dynamic image by using a wavelet transform.

2. Description of the Related Art

Conventionally, a discrete cosine transform (DCT) is popular for compressing natural image data such as static image data or dynamic image data. However, when encoding image data by using the DCT, a problem arises in achieving a high compression ratio since there is an inherent deterioration in subjective image quality caused by generation of a block distortion or a mosquito noise. In order to eliminate such a problem, various image encoding methods using a wavelet transform have been studied.

A brief description will now be given of the wavelet transform. A sub-band division shown in FIG. 1 can be performed on an analyzing side of a filter bank shown in FIG. 2. On the analyzing side of the filter bank, image data is filtered by a low-pass filter H0 and a 2:1 sub-sampling (↓2) is performed in a horizontal direction. The processed image data is filtered by a high-pass filter H1 in a horizontal direction and a 2:1 sub-sampling (↓2) is performed in a vertical direction. An image is restored by processing the obtained frequency-band signals on a synthesizing side of the filter bank. On the synthesizing side of the filter bank, a 2:1 up-sampling (↑2) and filtering by a low-pass filter F0 or a high-pass filter F1 are performed on each of the frequency band signals in a vertical direction, and a 2:1 up-sampling (↑2) and filtering is performed by the low-pass filter F0 or the high-pass filter F1 in a horizontal direction. An encoding method in which a signal is divided into frequency bands is generally referred to as a sub-band encoding. The encoding using a wavelet transform is regarded as a sub-band encoding as described below.

In the wavelet transform, a multilayer band division is performed by repeating the above-mentioned sub-band division on a low-band signal (a signal LL shown in FIG. 1). Such a band division is referred to as an octave division. If a division is performed for three layers, ten sub-bands are obtained as shown in FIG. 3. In FIG. 3, reference numerals 8 to 10 indicate sub-bands in the lowest layer, 5 to 7 indicate sub-bands in the middle layer, and 1 to 4 indicate sub-bands in the highest layer.

The frequency-band signals obtained by the above-mentioned division include signals (wavelet coefficients) LL, LH, HL and HH as shown in FIG. 1 or FIG. 3. In FIG. 3, the signal LL 1 is a signal on a low-band side in both the horizontal and vertical directions. The signal LL 1 is obtained by filtering image data by a two-dimensional low-pass filter (LPF). Hereinafter, the signal LL may be referred to as a "low-band component." The signals HL 3, 6 and 9 are obtained by filtering by a high-pass filter (HPF) in the horizontal direction and filtering by a low-pass filter in the vertical direction. An edge component in the vertical direction appears in the signal HL. Hereinafter, this edge component may be referred to as a "vertical component." The signals LH 2, 5 and 8 are obtained by filtering by a low-pass filter in the horizontal direction and filtering by a high-pass filter in the vertical direction. An edge component in the horizontal direction appears in the signals LH 2, 5 and 8. Hereinafter, this edge component may be referred to as a "horizontal component." The signals HH 4, 7 and 10 are obtained by filtering by a high-pass filter in both the horizontal direction and the vertical direction. An edge component in a diagonal direction appears in the signals HH 4, 7 and 10. Hereinafter, this edge component may be referred to as a "diagonal component".

It should be noted that in the wavelet transform, the above-mentioned filters are designed so as to satisfy a condition for completely restoring a signal, that is, to satisfy an orthogonal condition and a normal condition. Additionally, when a filter having a number of taps longer than the dividing number 2 in each band division is used, a block distortion may be prevented since overlapping of basic waveforms occurs. Further, as only the low band is repeatedly subjected to the band division, a shorter basic waveform is used as the frequency increases. Thus, it can be expected that a mosquito noise caused by a quantization distortion of a high-frequency component does not spread spatially.

A description will now be given of a conventional method for encoding wavelet coefficients. First, each wavelet coefficient is quantized into a scalar quantity. The quantization process uses a linear quantization for each band. Herein, an adaptive quantization in which the quantization process is switched for each band is not considered. The coefficients are encoded subsequent to the quantization. As for the method for encoding, there is a method suggested in "9.6-kb/s Picture Coding Using Wavelet Transform", a thesis of the 1993 Institute of Electronics, Information and Communication Engineers (IEICE) Spring Conference, D-262, 7-23. With respect to the quantized coefficients, one coefficient is taken from one of the bands LL, LH, HL and HH in the highest layer (in a case of three-times division). Four coefficients (2×2) are taken from each of the bands LH, HL and HH in the middle layer. Sixteen coefficients (4×4) are taken from each of the bands LH, HL and HH in the lowest layer. These coefficients are arranged in the same positional relationship so as to form an 8×8 block shown in FIG. 4. The sixty-four coefficients in the 8×8 block are scanned in an order shown in FIG. 5 so as to obtain a one-dimensional string of coefficients. Then, the coefficients are subjected to a two-dimensional Huffman encoding with [run length of zero run, significant coefficient]. However, only the DC component (LL coefficient of the highest layer) is subjected to a DPCM. As is apparent from FIG. 5, the scanning is performed from the highest layer toward the lowest layer. In the same layer, the canning is performed in the order of the vertical component (HL), the horizontal component (LH) and the diagonal component (HH). Additionally, the vertical components are scanned in the vertical direction, the horizontal components are scanned in the horizontal direction and the diagonal components are zigzag scanned.

Additionally, "Wavelet Transform Coding for Picture (2) Scanning Method suitable for Wavelet Basis—", a thesis of the 1993 Institute of Electronics, Information and Communication Engineer (IEICE) Spring Conference, D-336, 7-46, discloses another conventional method. In this method, 8×8 coefficients in a block are formed in a quad-tree structure by forming a single node by three coefficients (LH, HL, HH) located in the same spatial position in each layer, and scanning for a sub-tree is stopped at EOS (end of sub-tree) code. The node in the quad tree is scanned by a depth-first method, and is encoded as a one-dimensional string of the EOS or coefficients.

The conventional method described with reference to FIG. 5 is well adapted to the method in which the DCT coefficients in a 8×8 pixel block are zigzag scanned to form a one-dimensional coefficient string and the coefficient string is encoded by the two-dimensional Huffman encoding with [run length of zero run, significant coefficient]. However, this method is not always suitable for a characteristic of the wavelet transform coefficient. In a case in which the DCT coefficients are zigzag scanned, coefficients corresponding to frequency components in the same area (8×8) are scanned in a direction from a lower frequency to a higher frequency. Accordingly, energy is concentrated into a low-frequency component, and a large significant coefficient appears in the low-frequency component. On the other hand, a frequency of appearance of zero is increased on the high-frequency side, and a number of small significant coefficients is increased. Thus, a large number of short zero runs tend to appear and a small number of long zero runs tend to appear on the high-frequency side. According to such local concentration in appearance of zero run lengths, a number of objects to be encoded is decreased, and an amount of data can be decreased.

Also in the 8×8 block coefficients by the wavelet transform, the same tendency can be expected. However, since the 2×2 or 4×4 coefficients in each of the second and third layers are spatially adjacent to each other, an expected value of the coefficient is not decreased as the scanning progresses. Accordingly, as compared to the case of DCT coefficients, the significant coefficients do not always collectively appear in the beginning of the scanning. Rather, the significant coefficients are spatially maldistributed. That is, in each of the second and third layers, the zero coefficient tends to appear in a portion lacking energy of a directional component. On the contrary, in each of the second and third layers, the significant coefficient tends to appear in a portion having energy of a directional component. Accordingly, when a scan is performed from a higher-order position to a lower order position as is in the conventional method, an area in which significant coefficients are present is traversed in the second and third layers. Accordingly, a relatively long zero run tends to frequently appear in the second and third layers. Thus, an effect of data compression due to zero runs appearing in a particular area is reduced.

Additionally, in the wavelet transform, each of the vertical and horizontal edges in an image has a large significant coefficient in the corresponding direction thereof, and a directional component of a direction other than the corresponding directions of the edge rarely appears. In such a case, if scanning is performed in a direction from a higher position to a lower position without separating in each directional component, that is, if the coefficients in the same layer are scanned, for example, in the horizontal direction, the vertical direction and a diagonal direction, in that order, the scanning is performed by traversing a directional component having a small number of significant coefficients and a directional component having a large number of significant coefficients. Thus, a small number of long zero runs and a large number of short zero runs do not appear but a relatively long zero run frequently appears. This may decrease an encoding efficiency.

In the conventional method described with reference to FIG. 6, the 8×8 coefficients are formed in a quad-tree structure, and scanning is performed by a depth-first method. Accordingly, although spatially localized significant coefficients are not traversed, the scanning is performed by traversing significant coefficients that localize in different directional components.

Additionally, in both conventional methods, the coefficients in the second and third layers are 2×2 and 4×4 coefficients spatially adjacent to each other, respectively. Thus, a pattern having a strong correlation appears in a direction of each directional component. However, if a one-dimensional scan is performed, the above-mentioned nature may not be efficiently utilized.

SUMMARY OF THE INVENTION

It is a general object of the present invention to provide an improved and useful method for encoding wavelet coefficients in which the above-mentioned problems are eliminated.

A more specific object of the present invention is to provide a method for encoding wavelet coefficients which can achieve a high compression ratio for image data.

In order to achieve the above-mentioned objects, there is provided according to the present invention a method for encoding wavelet coefficients in an image encoding method in which image data is converted and quantized into coefficients by a two-dimensional wavelet transform and the coefficients having the same spatial position are collected to form a block so as to encode the coefficients on an individual block basis, the method comprising the steps of:

defining a layered quad-tree structure of the coefficients included in each block with respect to each of a set of coefficients representing a vertical component, a set of coefficients representing a horizontal component and a set of coefficients representing a diagonal component, each quad-tree structure having a root corresponding to a coefficient of a lowest frequency band;

searching for a zero tree of which all descendant nodes lack a significant coefficient;

encoding positional information of the zero-tree;

scanning the coefficients other than descendants of the zero tree so as to form a one-dimensional coefficient string of the scanned coefficients; and encoding the one-dimensional coefficient string according to a two-dimensional encoding method using a run length of a zero run immediately preceding a significant coefficient and the significant coefficient.

According to the above-mentioned invention, only the coefficients other than the descendants of the zero tree are scanned to form the one-dimensional coefficient string by utilizing the fact that the coefficients forming a block have a layered quad-tree structure. Thereby, a run length of a zero run can be shorter than that of a case in which all non-significant coefficients are scanned. Thus, a compression ratio is increased. Additionally, even if an over head of a sub-tree which does not include a significant coefficient is generated, the non-significant coefficients can be efficiently represented by the zero-tree method rather than a method with a combination of a code indicating a predetermined number of zero runs corresponding to a respective level and a number of remaining zeros.

Additionally, the method according to the present invention may further comprise the steps of:

producing a zero-tree map having a layered quartered-tree structure corresponding to the coefficient tree, each node of the zero tree map indicating whether or not a corresponding coefficient is a root of the zero-tree, each node being represented by one-bit data;

scanning the zero-tree map according to a depth-first method so as to change the zero tree map into a one-dimensional string of the nodes; and producing encoded data of the positional information of the zero-tree map by encoding the one-dimensional string of the nodes.

According to this invention, the positional information of the zero-tree can be efficiently encoded.

Additionally, in the above-mentioned invention, the one-dimensional string produced from the zero-tree map may be encoded by a run length encoding method. Since "1" frequently appears when the one-dimensional string is produced from the zero-tree map, an encoding can be efficiently performed by the run length encoding method.

Additionally, in the scanning step of the present invention, the coefficients other than descendants of the zero-tree may be scanned separately in each of the set of coefficients representing the vertical component, the set of coefficients representing the horizontal component, and the set of coefficients representing the diagonal component on a depth-first method.

Accordingly, a frequency of appearance of a relatively long zero run due to spatial localization of significant coefficients in each level can be reduced. Thereby, an efficiency of encoding can be increased.

Additionally, the set of coefficients representing the vertical component may be scanned in an order of upper left, lower left, upper right and lower right; the set of coefficients representing the horizontal component may be scanned in an order of upper left, upper right, lower left and lower right; and the set of coefficients representing the diagonal component may be scanned in an order of upper left, lower right, upper right and lower left.

In this invention, a scanning for each level is performed in a direction toward a position having a strong correlation. Thus, significant coefficients that are spatially localized can be collectively scanned, which improves an encoding efficiency.

Additionally, there is provided according to another aspect of the present invention a method for encoding wavelet coefficients in an image encoding method in which image data is converted and quantized into coefficients by a two-dimensional wavelet transform and the coefficients having the same spatial position are collected to form a block so as to encode the coefficients on an individual block basis, the method comprising the steps of:

defining a layered quad-tree structure of coefficients included in the block with respect to each of a set of coefficients representing a vertical component, a set of coefficients representing a horizontal component and a set of coefficients representing a diagonal component, each quad-tree structure having a root corresponding to a coefficient of a lowest frequency band;

searching for a zero tree of which all descendant nodes lack a significant coefficient;

scanning the coefficients other than descendants of the zero tree according to a depth-first method, a scanning being separately performed for each of the set of coefficients representing the vertical component, the set of coefficients representing the horizontal component and the set of coefficients representing the diagonal component;

producing a coefficient vector by using four coefficients of each node of each quad-tree structure and producing an EOS code at a root of the zero tree so as to produce a string of the coefficient vectors and the EOS codes; and encoding the string of the coefficient vectors and the EOS codes by a variable length encoding method.

Accordingly, a spatial correlation of four coefficients is utilized and, thereby, an efficient encoding can be performed.

Additionally, the set of coefficients representing the vertical component may be scanned in an order of upper left, lower left, upper right and lower right; the set of coefficients representing the horizontal component may be scanned in an order of upper left, upper right, lower left and lower right; and the set of coefficients representing the diagonal component may be scanned in an order of upper left, lower right, upper right and lower left.

In this invention, a scanning for each level is performed in a direction toward a position having a strong correlation. Thus, significant coefficients that are spatially localized can be collectively scanned, which improves an encoding efficiency.

Additionally, in the encoding step, the string of the coefficient vectors and the EOS codes may be adaptively encoded by a variable length encoding based on a class of a degree of a value of a coefficient corresponding to a parent coefficient of the coefficient vectors or the EOS code to be encoded.

Accordingly, a correlation between a parent coefficient and four child coefficients is utilized and, thereby, an efficient encoding can be performed.

Additionally, in the encoding step, the string of the coefficient vectors and the EOS codes may be adaptively encoded by a variable length encoding based on a level of a frequency band in which the coefficient or the EOS code to be encoded is located.

Accordingly, a correlation between the coefficients and the level of the frequency band is utilized and, thereby, an efficient encoding can be performed.

Additionally, in the encoding step, the string of the coefficient vectors and the EOS codes may be adaptively encoded by a variable length encoding using a combination of a coefficient vector including a significant coefficient or an EOS code and a number of the coefficient vectors each of which lack a significant coefficient.

According to this invention, since a vector of which all coefficients are non-significant coefficients other than descendants of the zero-tree are encoded as a number of consecutive vectors, a number of vectors to be encoded is decreased which improves an encoding efficiency.

Other objects, features and advantages of the present invention will become more apparent from the following detailed description when read in conjunction with the accompanying drawings.

BRIEF DESCRIPTION OF THE DRAWINGS

FIG. 18 is an illustration of a string of coefficient vectors and EOS codes produced by 8×8 coefficients shown in FIG. 10A in the third embodiment;

FIG. 19 is an illustration of a string of coefficient vectors and EOS codes produced by 8×8 coefficients shown in FIG. 10A in the fourth embodiment;

FIG. 21 is an illustration showing a string of a number of consecutive non-significant coefficient vectors and significant coefficient vectors or EOS codes when encoding 8×8 coefficients shown in FIG. 20A in the fifth embodiment.

DETAILED DESCRIPTION OF THE PREFERRED EMBODIMENTS

A description will now be given of embodiments of the present invention.

Figure 1:
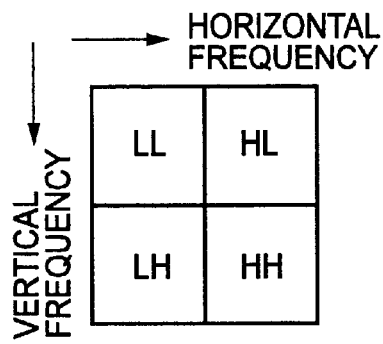
FIG. 1 is an illustration for showing a two-dimensional sub-band division.
Figure 3:
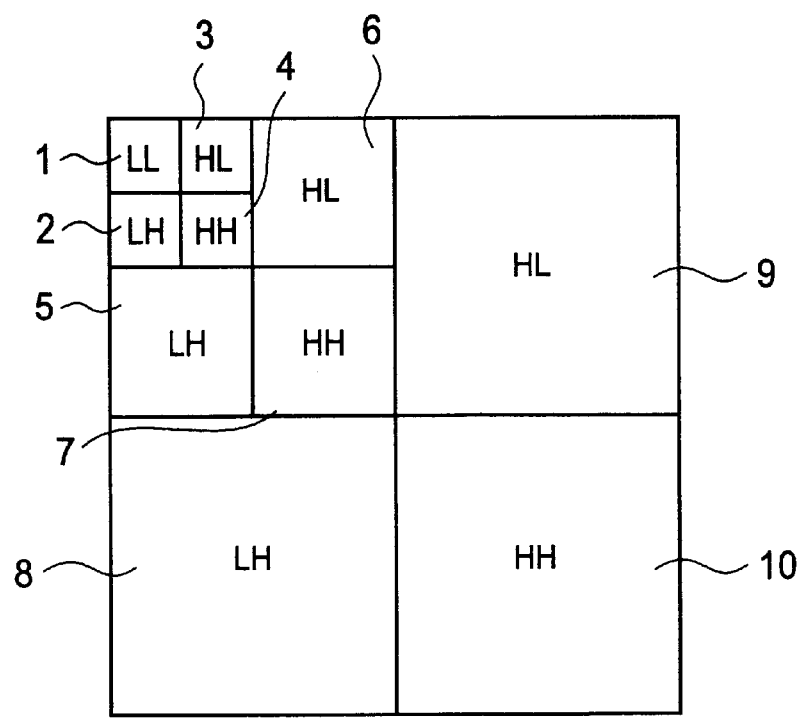
FIG. 3 is an illustration for showing an octave division with three layers.
Figure 2:
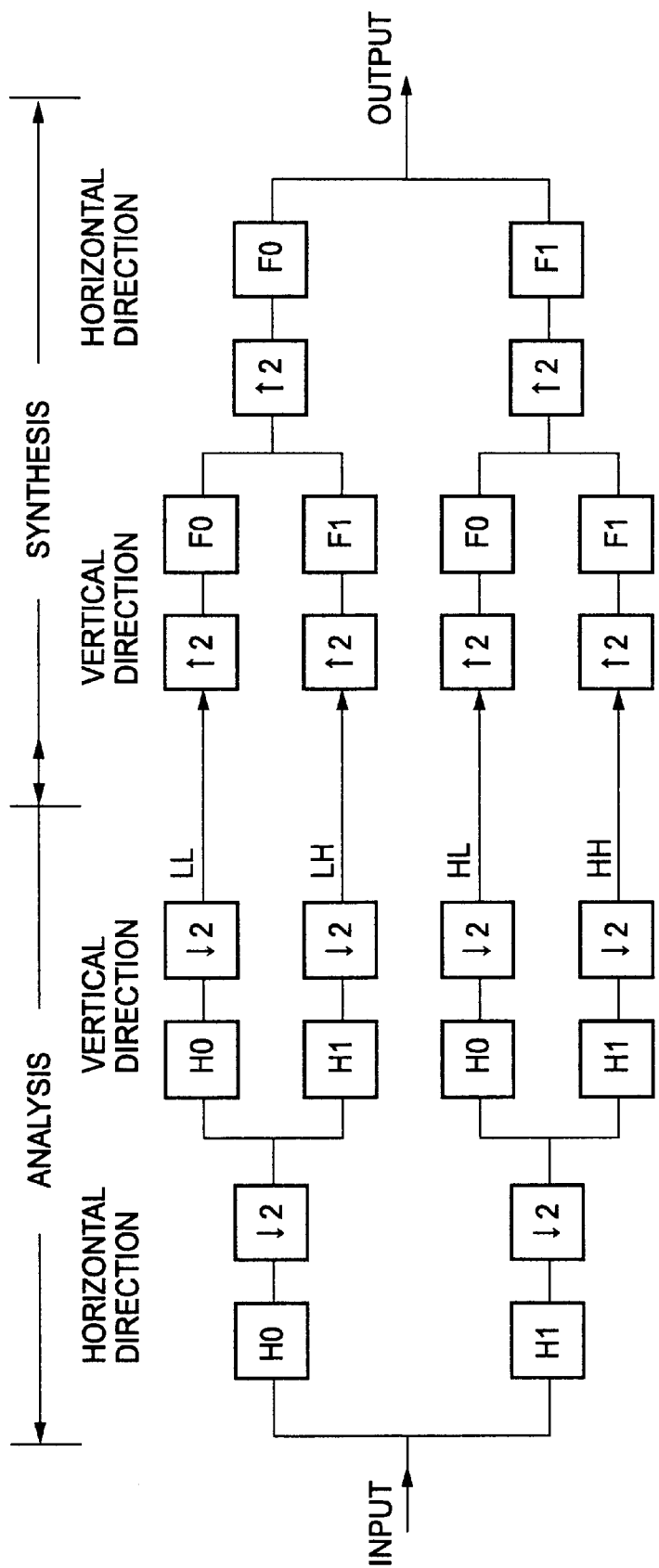
FIG. 2 is a diagram of a filter bank for a two-dimensional wavelet transform.
Figure 4:
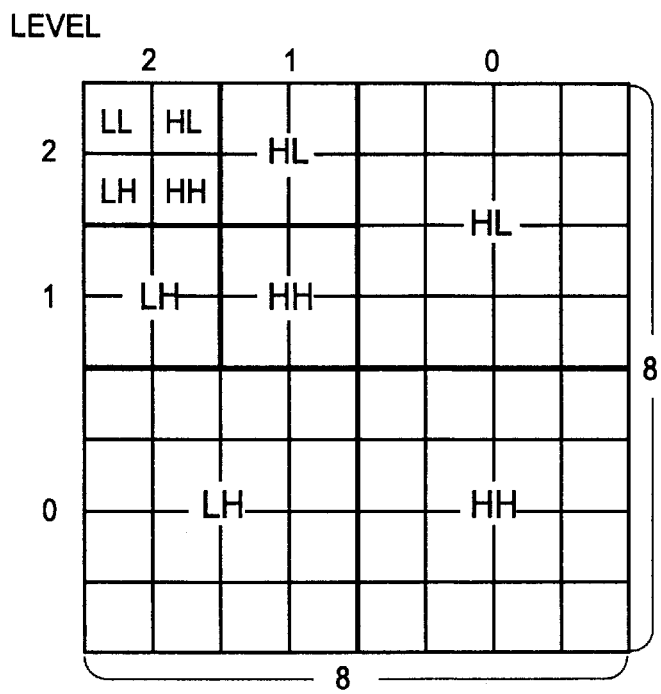
FIG. 4 is an illustration of a block including 8×8 coefficients.
Figure 5:
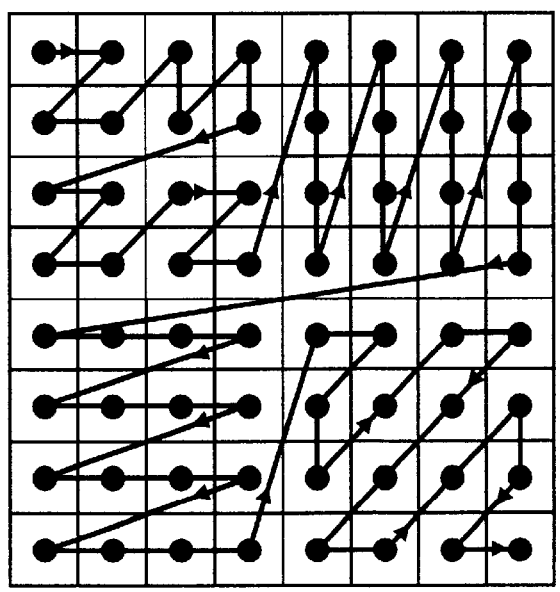
FIG. 5 is an illustration for showing an order of scanning for coefficients in a block by a conventional method.
Figure 6:
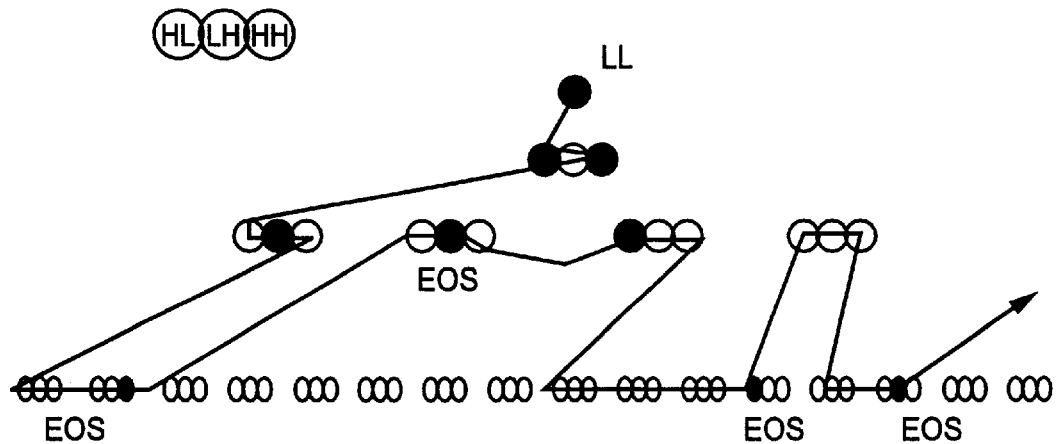
FIG. 6 is an illustration for explaining a conventional method using a quartered-tree structure and an EOS code.
Figure 7:
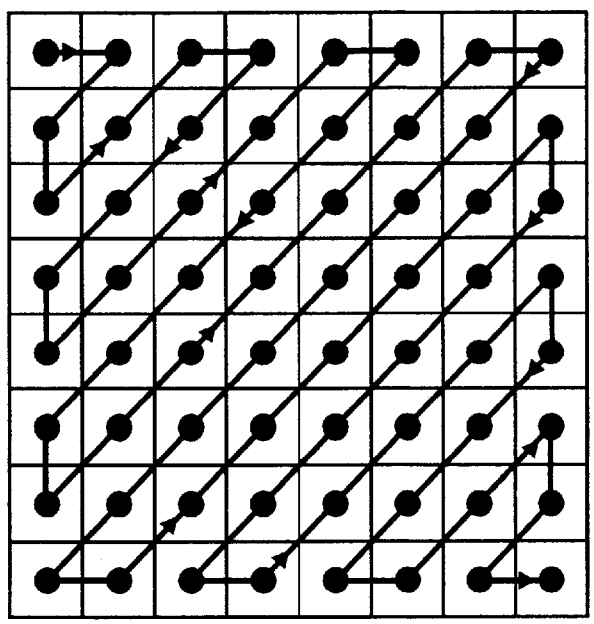
FIG. 7 is an illustration showing a conventional zigzag scanning of coefficients in a block.
Figure 8:
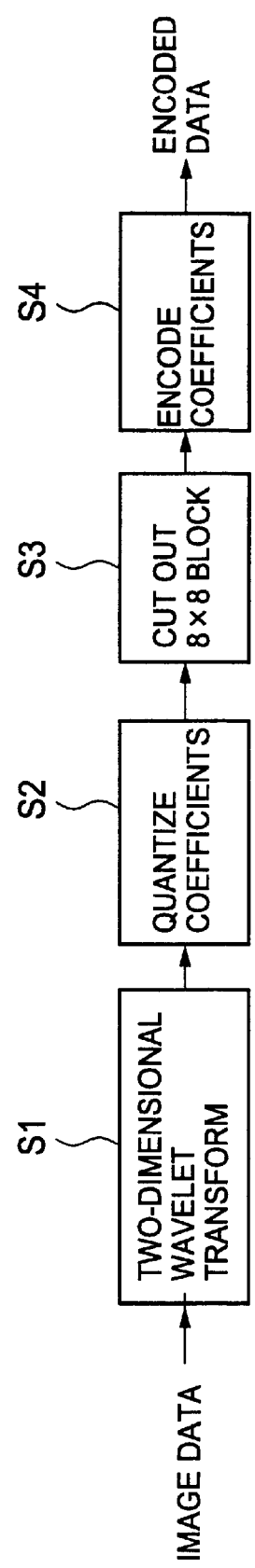
FIG. 8 is a flowchart of an entire process for encoding an image according to the present invention.

FIG. 8 shows a flowchart of an entire process for encoding an image according to the present invention. In step S1, image data is subjected to a two-dimensional wavelet transform process. In step S2, the obtained wavelet coefficients are quantized. The quantized coefficients are formed in a block in step S3, and are encoded on a block unit basis in step S4.

The present invention is related to the coefficient encoding process step S4, and the wavelet transform step S1, the coefficient quantization step S2 and the block-cut-out step S3 may be the same as that performed in the conventional methods. Thus, a description will be given below of only the coefficient encoding process step S4. It should be noted that the description below is based on the assumption that a size of the block of the coefficients is 8×8 (=$2^3 \times 2^3$). However, the present invention is applicable to a general case in which a number of layers for a band division is set to N and the size of the block is set to $2^N \times 2^N$.

<First Embodiment>

Figure 9:
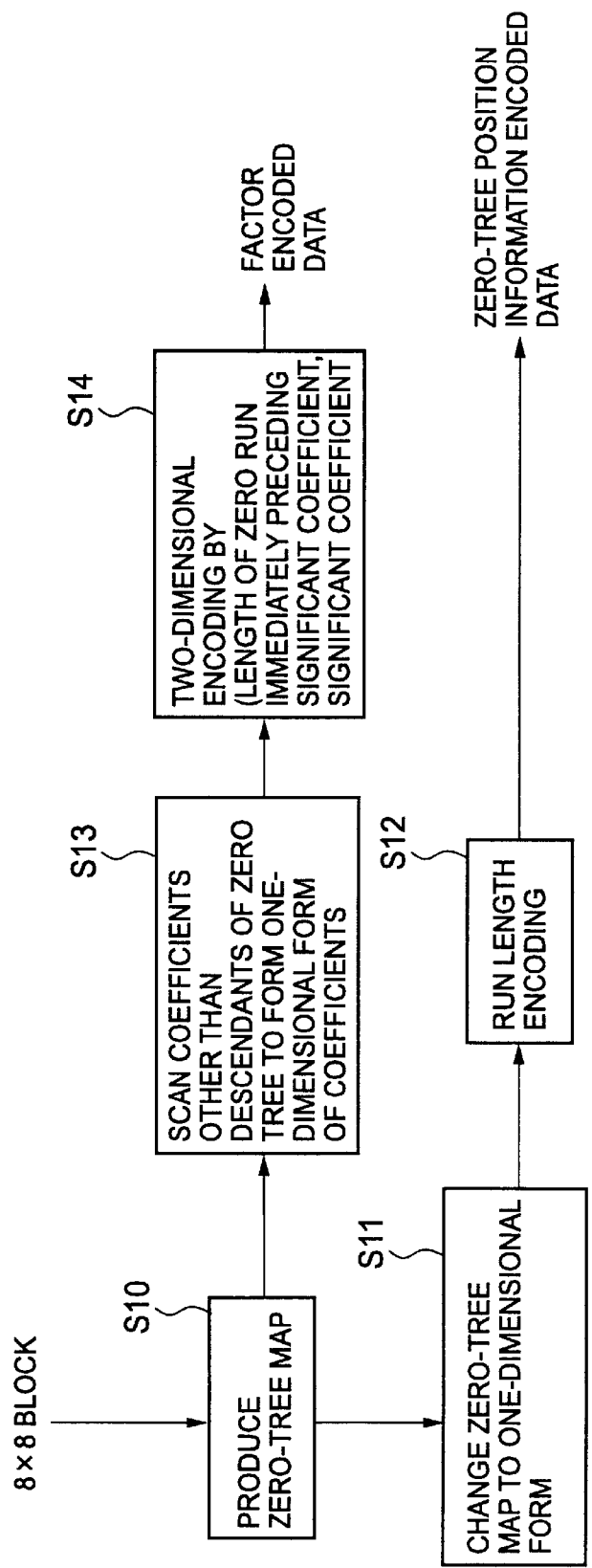
FIG. 9 is a flowchart of a coefficient encoding process according to a first embodiment of the present invention.

FIG. 9 is a flowchart of the coefficient encoding process step according to the first embodiment of the present invention.

Figure 10A:
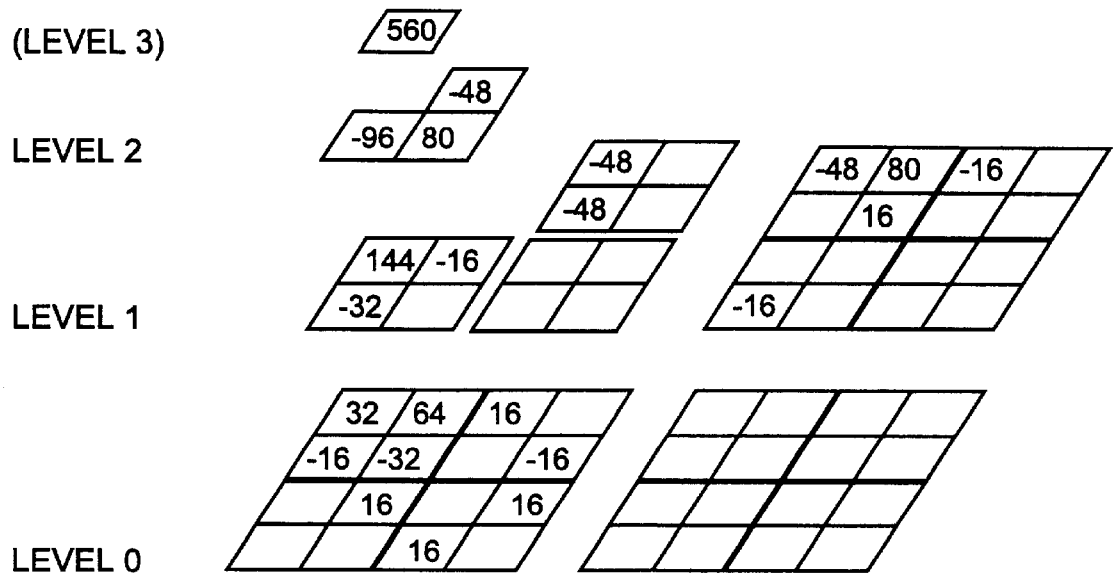
FIG. 10A is an illustration for explaining a process for producing a quad-tree structure.

The 8×8 coefficients in a block have a quad-tree structure having three layers for each of the components LH, HL and HH as shown in FIG. 10A. Additionally, if the LL component is regarded as a parent and the other three coefficients LH, HL and HH in the highest layer are regarded as children, a quad-tree structure having four layers is obtained (only the highest layer is a trichotomous tree).

Figure 10B:
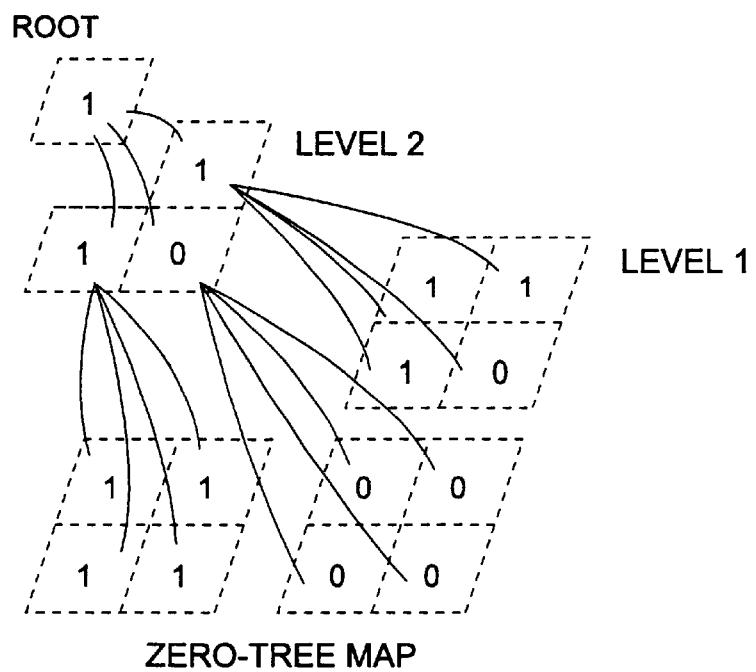
FIG. 10B is an illustration for explaining a zero-tree map.

In step S10 of FIG. 9, a zero tree (descendants thereof are all zero) is searched for with respect to the quad-tree structure of 8×8 coefficients so as to produce a zero-tree map. Specifically, the quad-tree structure of 8×8 coefficients is searched for on a depth priority basis from the LL coefficient in the highest layer, that is, the third level. If there is a node whose descendants are all zero coefficients (non-significant coefficients), zero "0" is set to a position corresponding to that node. On the other hand, if at least one of the descendants is a significant coefficient, one "1" is set to the position of that node. Since the nodes in the level zero, that is, the lowest layer, do not have descendants, the search is performed until the layer that is one layer above the lowest layer. Thus, a 16-bit zero-tree map shown in FIG. 10B is produced with respect to the quad-tree structure of the 8×8 coefficients shown in FIG. 10A.

Figure 11:
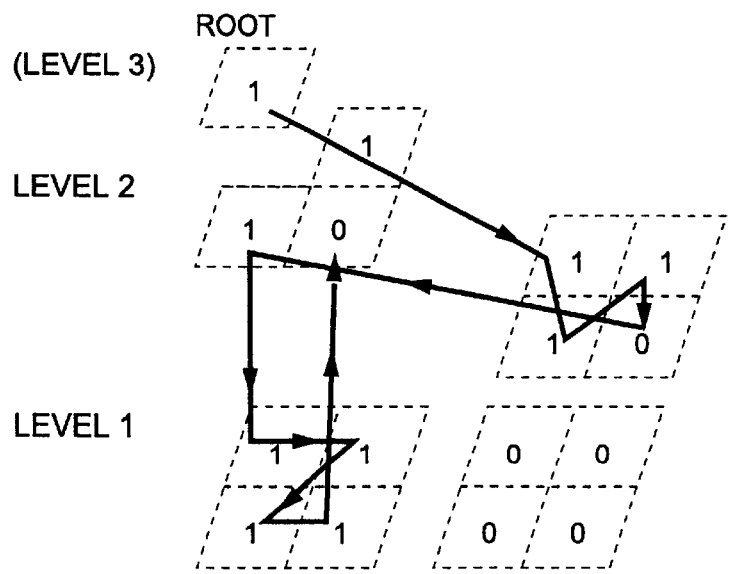
FIG. 11 is an illustration for explaining a one-dimensional scanning of the zero-tree map shown in FIG. 10.

In step S11, the zero-tree map (quartered tree) is searched for according to the depth-first method starting from a root (a node corresponding to the LL coefficient of the level 3) so as to change the zero-tree map to a one-dimensional binary string. Specifically, starting from the root, first a node corresponding to the vertical component of the level 2 is searched for. If that node is one "1", the four children (corresponding to the 2×2 coefficients of the vertical component of the level 1) are vertically scanned in the order of upper left, lower left, upper right and lower left. Thereafter, the search proceeds to a node corresponding to the horizontal component of the level 2. If that node is one "1", the four children (corresponding to the 2×2 coefficients of the horizontal component of the level 1) are horizontally scanned in the order of upper left, upper right, lower left and lower right. Thereafter, the search proceeds to a node corresponding to the diagonal component of the level 2. If that node is one "1", the four children (corresponding to the 2×2 coefficients of the diagonal component of the level 1) are horizontally scanned in the order of upper left, lower right, upper right and lower left. It should be noted that if a node set to zero "0" is reached during the search, this means that all the descendants thereof are zero and information regarding the children is not needed. Thus, the search does not proceed to the children of the node set to zero "0". In the case of the zero-tree map shown in FIG. 10B, the search is performed along a route shown in FIG. 11, and a one-dimensional string [111110111110] is obtained.

In step S12, the thus-obtained one dimensional string of the zero-tree map is encoded by a run-length encoding so as to produce encoded data of the positional information of zero trees. As seen in the above-mentioned example, since the node set to one "1" (non-zero-tree) appears more frequently than the node set to zero "0", only consecutive numbers preceding zero "0" are encoded by a variable-length encoding method.

In step S13, a one-dimensional coefficient string is produced by scanning the coefficients other than descendants of zero-trees. Specifically, the zero-tree map is traced in the same route as that of the one-dimensional string while tracing the corresponding coefficients in the quartered tree so as to scan the coefficients according to a depth-first method until the coefficients of the level 0 are reached. When a node set to "0" is reached, the descendant coefficients thereof are not scanned. An order of scanning for four children is the same as that when the zero-tree map is changed into the one-dimensional string. That is, the order of scanning for four children is the order (vertical scanning) of upper left, lower left, upper right and lower right for the vertical component; the order (horizontal scanning) of upper left, upper right, lower left and lower right for the horizontal scanning; and the order (diagonal scanning) of upper left, lower right, upper right and lower left for the diagonal scanning.

Figure 12:
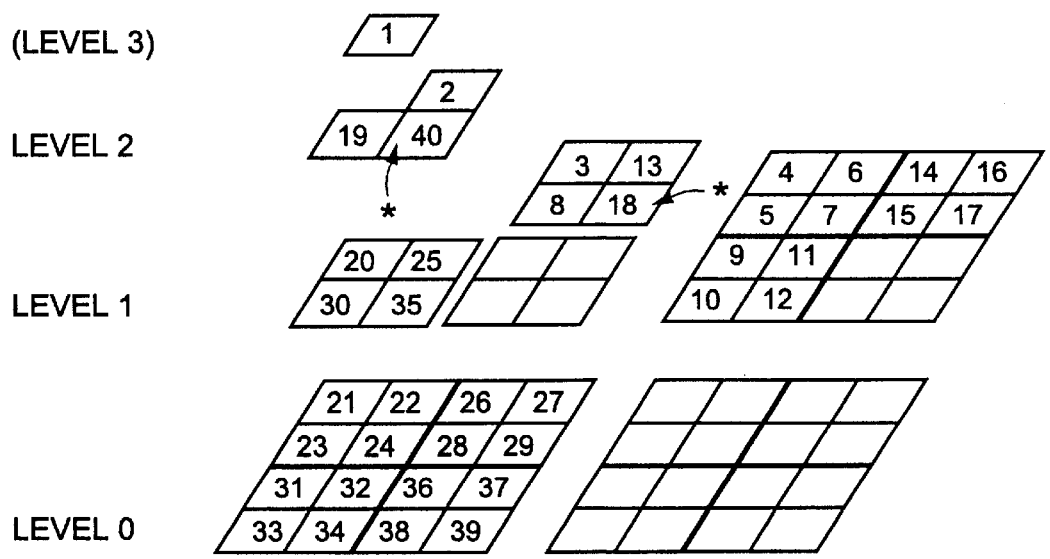
FIG. 12 is an illustration for showing an order of scanning of 8×8 coefficients shown in FIG. 10A.

For example, in the case of 8×8 coefficients shown in FIG. 10A, the coefficients are scanned in the order of numbers 1 to 40 in FIG. 12. That is, the coefficients are scanned in the order of: the LL coefficient of the level 3→the HL coefficient of the level 2→the upper-left HL coefficient of the level 1→vertical scanning of the 2×2 HL coefficients of the level 0→the lower-left HL coefficient of the level 1→vertical scanning of the lower-left 2×2 HL coefficients of the level 0→ . . . → the LH coefficient of the level 2→the upper-left LH coefficient of the level 1→horizontal scanning of the 2×2 LL coefficients of the level 0→the upper-right LH coefficient of the level 1→horizontal scanning of the upper right 2×2 LH coefficients of the level 0→ . . . → horizontal scanning of the lower right 2×2 LH coefficients of the level 0→the HH coefficient of the level 2. Since the HH coefficient of the level 2 is a root (*) of a zero tree, the scanning does not proceed to its descendants and the scanning is ended. Additionally, since the lower-right HL coefficient of the level 1 is also a root (*) of a zero tree, the scanning does not proceed to its descendants and the scanning proceeds to the LH coefficient of the level 2. Accordingly, the 8×8 coefficients shown in FIG. 10A are changed to a one-dimensional coefficient string, "560, −48, −48, −48, 0, 80, 16, −48, 0, −16, 0, 0, 0, −16, 0, 0, 0, 0, −96, 144, 32, 64, −16, −32, −16, 16, 0, 0, −16, −32, 0, 16, 0, 0, 0, 0, 16, 16, 0, 80."

In step S14, a two-dimensional Huffman encoding is performed on the one-dimensional coefficient string obtained in the previous step with [run length of zero run immediately preceding significant coefficient, significant coefficient] so as to produce encoded data of the coefficients. It should be noted that the encoding method itself is the same as that of the conventional method.

Figure 20A:
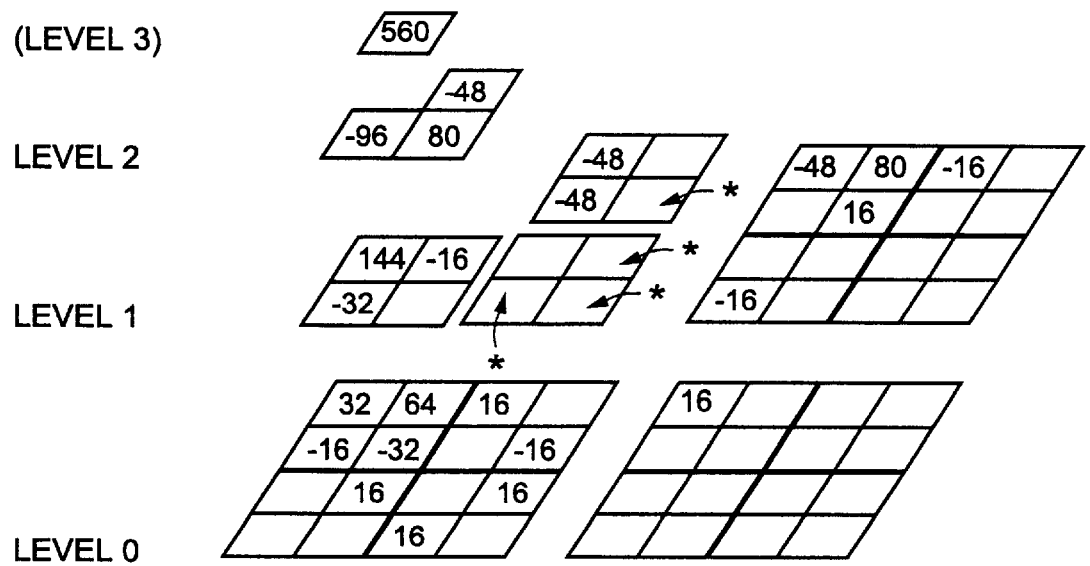
FIG. 20A is an illustration for explaining a process for producing a quad-tree structure.
Figure 20B:
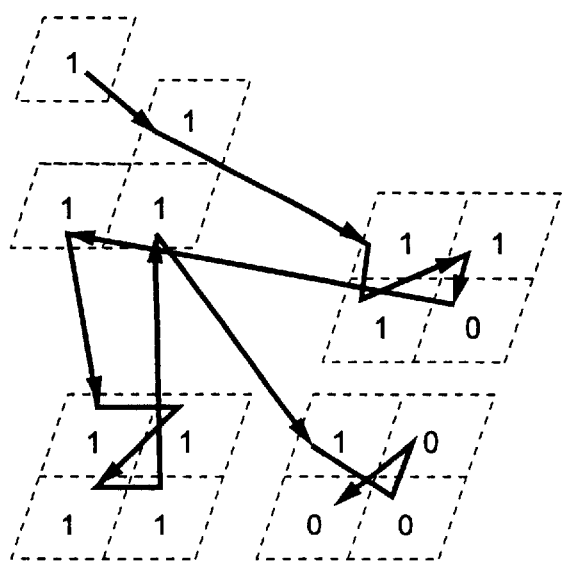
FIG. 20B is an illustration for explaining a zero-tree map.

In the case of 8×8 coefficients shown in FIG. 20A, the zero-tree map is searched for in an order as shown in FIG. 20B, and a one-dimensional string [1111101111111000] is obtained. The 8×8 coefficients shown in FIG. 20A are different from the 8×8 coefficients shown in FIG. 10A in that the upper-left coefficient among the 2×2 HH coefficients of the level 0 is a significant coefficient. Accordingly, the HH coefficient of the level 2 is not a root of a zero tree, and the children of the HH coefficient of the level 2 are searched for. Thus, the three HH coefficients and one HL coefficient provided with marks * are roots of zero trees. Therefore, the 8×8 coefficients shown in FIG. 20A are changed into a one-dimensional coefficient string, "560, −48, −48, −48, 0, 80, 16, −48, 0, −16, 0, 0, 0, −16, 0, 0, 0, 0, −96, 144, 32, 64, −16, −32, −16, 16, 0, 0, −16, −32, 0, 16, 0, 0, 0, 0, 16, 16, 0, 80, 0, 16, 0, 0, 0, 0, 0, 0."

<Second Embodiment>

Figure 13:
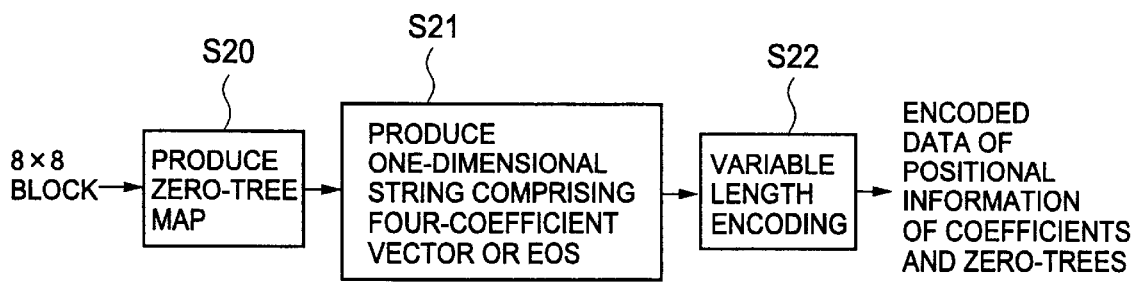
FIG. 13 is a flowchart of a coefficient encoding process according to a second embodiment of the present invention.

FIG. 13 shows a flowchart of a coefficient encoding process according to a second embodiment of the present invention.

A zero-tree map of the 8×8 coefficients is produced in step S20. This process is the same as that of the step S10 of the above-mentioned first embodiment, and a description thereof will be omitted. In the present embodiment, the encoding of the zero-tree map is not performed. This is because the positional information regarding the zero-tree map is encoded as a form of EOS (end of sub-tree) code together with the coefficient information.

In step S21, the zero-tree map is referred to and the quad tree of the 8×8 coefficients is searched for by each of the horizontal components, the vertical components and the diagonal components, in that order. Four coefficients corresponding to children of a node other than a root of a zero tree are scanned. At this time, a vertical scanning is performed for the vertical component, a horizontal scanning is performed for the horizontal component and a diagonal scanning is performed for the diagonal direction. The obtained four coefficients are rearranged in the order of scanning so as to produce a four-dimensional vector. Coefficients corresponding to children of a node corresponding to a root of a zero tree are not scanned, and the EOS code is produced so that a one-dimensional coefficient string in which the coefficient vectors and the EOS codes are rearranged in the searched order is obtained. However, since the number of the coefficients of the level 2 that are children of a root is three, a three-dimensional vector is exceptionally produced by these coefficients. Additionally, coefficients other than zero trees are changed into a vector even if the four coefficients are all zero.

Figures 16, 17:
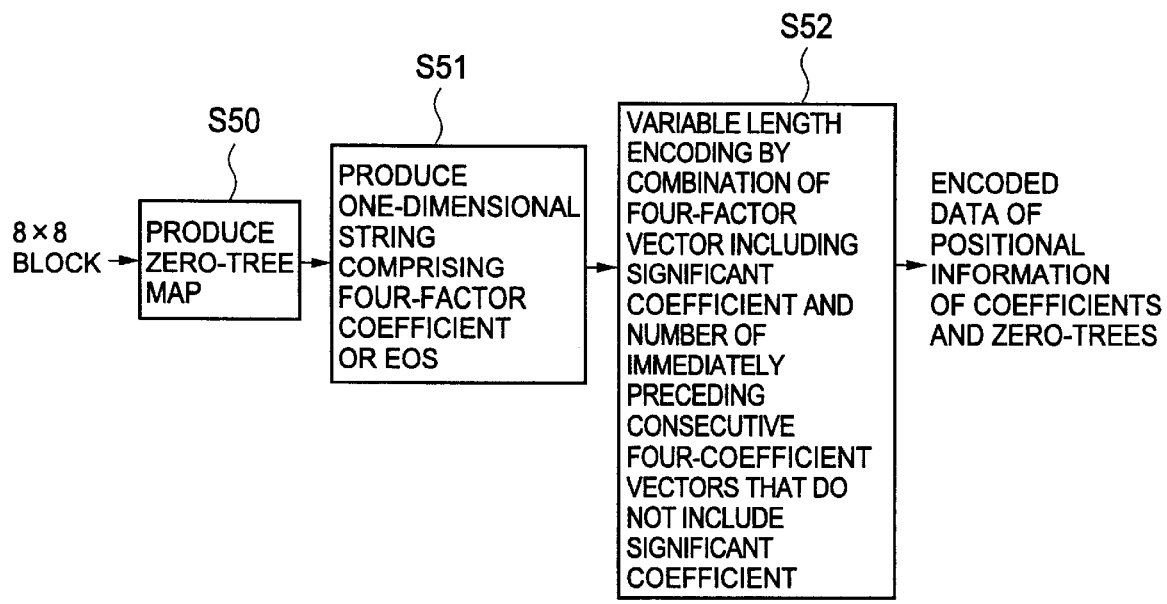
FIG. 16 is a flowchart of a coefficient encoding process according to a fifth embodiment of the present invention.
FIG. 17 is an illustration of a string of coefficient vectors and EOS codes produced by 8×8 coefficients shown in FIG. 10A in the second embodiment.

For example, in the case of the 8×8 coefficients shown in FIG. 10A, the three coefficients of the level 2 are changed into a vector. At this time, all components are exceptionally handled together. Thereafter, the vertical components are searched for, and the 2×2 HL coefficients of the level 1 are vertically scanned and changed into a vector. Additionally, the upper left 2×2 HL coefficients, the lower-left 2×2 HL coefficients and the upper right 2×2 HL coefficients of the level 0 corresponding to children of the 2×2 HL coefficients of the level 1 are vertically scanned in that order, and are changed into respective vectors. However, since the lower right HL coefficient among the 2×2 HL coefficients of the level 1 is a root of a zero tree, the EOS code is produced and the children, that is, the lower-right 2×2 HL coefficients of the level 0, are not scanned. Thereafter, a search for the horizontal components is started by the 2×2 HL coefficients of the level 1 being horizontally scanned and changed into a vector. Then, the search is shifted to the diagonal components. However, since the HH coefficient of the level 2 corresponds to a root of a zero tree, the HH coefficients of the level 1 corresponding to the descendants of the HH coefficient of the level 2 and the HH coefficients of the level 0 are not scanned and the EOS codes are produced so as to end the search. Accordingly, a one-dimensional coefficient string comprising the coefficient vectors and the EOS codes shown in FIG. 17 is obtained.

In step S22, a variable length encoding is performed on the coefficient strings produced in the previous steps comprising the coefficient vectors and the EOS codes so as to produce encoded data of the coefficients and the positional information of zero trees. It should be noted that the vector produced by the three coefficients of the level 2 is encoded by an encoding method different from that used on the vectors produced by four coefficients.

<Third Embodiment>

Figure 14:
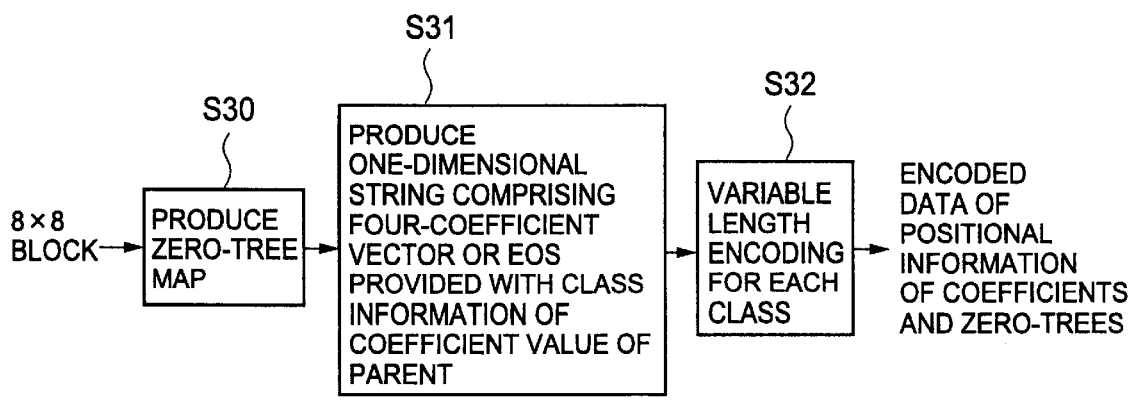
FIG. 14 is a flowchart of a coefficient encoding process according to a third embodiment of the present invention.

FIG. 14 shows a flowchart of a coefficient encoding process according to a third embodiment of the present invention.

A zero-tree map of the 8×8 coefficients is produced in step S30. This process is the same as that of the step S10 of the above-mentioned first embodiment, and a description thereof will be omitted. In the present embodiment, since the positional information of a zero tree is encoded together with the coefficient information similar to the above-mentioned second embodiment, the zero-tree map is not encoded.

In step S31, a one-dimensional string comprising the coefficient vectors and the EOS codes is produced with respect to the 8×8 coefficients in a similar manner as step S21 of the above-mentioned second embodiment. The process of step S31 is different from the process of step S21 only in that, in the process of step S31, the coefficient vector or the EOS code is provided with class information regarding a coefficient value corresponding to a parent thereof. The class of the coefficient value is assigned, for example, as shown in the following Table 1.

TABLE 1

| Coefficient Value | Class |
|---|---|
| 0 | 0 |
| −1, 1 | 1 |
| −3. −2, 2, 3 | 2 |
| −7, . . . , −4, 4, . . . , 7 | 3 |
| −15, . . . , −8, 8, . . . , 15 | 4 |
| −31, . . . , −16, 16, . . . , 31 | 5 |
| . | . |
| . | . |
| . | . |

For example, in the case of the 8×8 coefficients shown in FIG. 10A, the one-dimensional string comprising the coefficient vectors and the EOS codes provided with the class information is produced as shown in FIG. 18.

In step S32, the coefficient vector or the EOS code included in the one-dimensional string produced in the previous step is subjected to a variable length encoding adaptively on each individual class basis. That is, the variable length code is designed for each class, and encoding is performed by using the variable length code. Although the Huffman encoding method may be used for encoding, other variable length encoding methods may be used, if necessary.

<Fourth embodiment>

Figure 15:
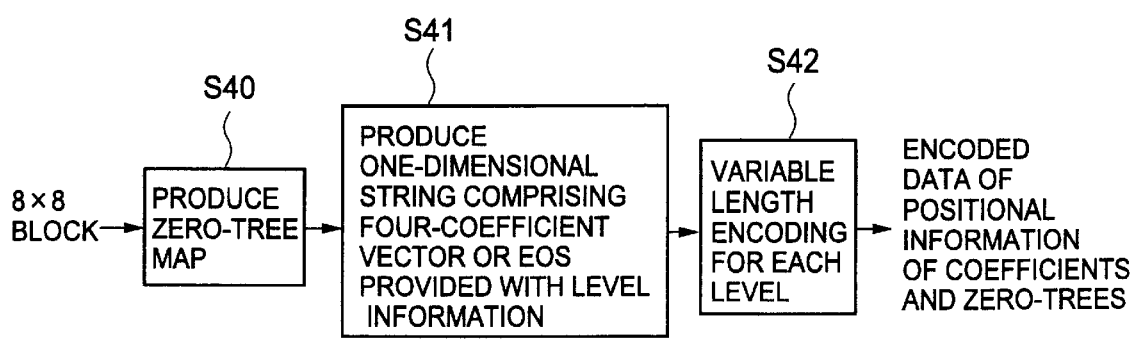
FIG. 15 is a flowchart of a coefficient encoding process according to a fourth embodiment of the present invention.

FIG. 15 shows a flowchart of a coefficient encoding process according to a fourth embodiment of the present invention.

A zero-tree map of the 8×8 coefficients is produced in step S40. This process is the same as that of the step S10 of the above-mentioned first embodiment, and a description thereof will be omitted. In the present embodiment, since the positional information of a zero tree is encoded together with the coefficient information similar to the above-mentioned second embodiment, the zero-tree map is not encoded.

In step S41, a one-dimensional string comprising the coefficient vectors and the EOS codes is produced with respect to the 8×8 coefficients in a similar manner as step S21 of the above-mentioned second embodiment. The process of step S41 is different from the process of step S21 only in that, in the process of step S41, the coefficient vector or the EOS code is provided with information regarding a level of a frequency band in which the coefficient or the EOS code is located. For example, in the case of the 8×8 coefficients shown in FIG. 10A, the one-dimensional string comprising the coefficient vectors and the EOS codes provided with the level information is produced as shown in FIG. 19.

In step S42, the coefficient vector or the EOS code included in the one-dimensional string produced in the previous step is subjected to a variable length encoding adaptively on each individual level basis. That is, the variable length code is designed for each level, and encoding is performed by using the variable length code. Although the Huffman encoding method may be used for encoding, other variable length encoding methods may be used, if necessary.

<Fifth Embodiment>

FIG. 16 shows a flowchart of a coefficient encoding process according to a fifth embodiment of the present invention.

A zero-tree map of the 8×8 coefficients is produced in step S50. This process is the same as that of the step S10 of the above-mentioned first embodiment, and a description thereof will be omitted. In the present embodiment, since the positional information of a zero tree is encoded together with the coefficient information similar to the above-mentioned second embodiment, the zero-tree map is not encoded.

In step S51, a one-dimensional string comprising the coefficient vectors and the EOS codes is produced with respect to the 8×8 coefficients in a similar manner as step S21 of the above-mentioned second embodiment while tracing the zero-tree map. For example, in the case of the 8×8 coefficients shown in FIG. 20A, since the 2×2 HH coefficients of the level 1 are all zero, a vector (0, 0, 0, 0) is produced. Thereafter, the upper-left 2×2 HH coefficients are changed into a vector. Since a coefficient provided with the * mark among the 2×2 HH coefficients of the level 1 is a root of a zero tree, the EOS code is produced and a vector is not produced for the four coefficients corresponding to the children thereof.

In the subsequent step S52, the one-dimensional string produced in the previous step is subjected to a variable length encoding process using a combination of an EOS code or a coefficient vector that includes at least one significant coefficient and a number of consecutive coefficient vectors immediately preceding the coefficient or the EOS code that do not include a significant coefficient. For example, the 8×8 coefficients shown in FIG. 20A are variable-length encoded as shown in FIG. 21. In a case of the fourth coefficient vector from the bottom in FIG. 21, since one coefficient vector that does not include a significant coefficient is present in the immediately preceding position, the coefficient vector is encoded as (1, 16, 0, 0, 0). The number "1" at the beginning indicates that there is one coefficient vector which does not include a significant coefficient at the immediately preceding position. Although the Huffman encoding method may be used for encoding, other variable length encoding methods may be used, if necessary.

The present invention is not limited to the above-mentioned examples, but is widely applicable to a static image or dynamic image processing apparatus, a static image or dynamic image handling equipment, an information processing apparatus or automation equipment as long as an encoding method of a wavelet transform coefficient satisfying the scope of the present invention is used.

The present invention is not limited to the specifically disclosed embodiments, but variations and modifications may be made without departing from the scope of the present invention.

The present application is based on Japanese priority application No.9-359518 filed on Dec. 26, 1997, the entire contents of which are hereby incorporated by reference.

What is claimed is:

1. A method for encoding wavelet transform coefficients in an image encoding method in which image data is converted and quantized into coefficients by a two-dimensional wavelet transform and the coefficients having the same spatial position are collected to form a block so as to encode the coefficients on an individual block basis, the method comprising the steps of:

defining a layered quad-tree structure of the coefficients included in each block with respect to each of a set of coefficients representing a vertical component, a set of coefficients representing a horizontal component and a set of coefficients representing a diagonal component, each quad-tree structure having a root corresponding to a coefficient of a lowest frequency band;

searching for a zero tree of which all descendant nodes lack a significant coefficient;

encoding positional information of the zero-tree;

scanning the coefficients other than descendants of the zero-tree so as to form a one-dimensional coefficient string of the scanned coefficients;

encoding the one-dimensional coefficient string according to a two-dimensional encoding method based on (1) run lengths of zero runs immediately preceding significant coefficients and (2) the significant coefficients;

producing a zero-tree map having a layered quad-tree structure corresponding to the coefficient tree, each node of the zero-tree map indicating whether or not a corresponding coefficient is a root of the zero tree, each node being represented by one-bit data;

scanning the zero-tree map according to the depth-first method so as to change the zero-tree map into a one-dimensional string of the nodes; and producing encoded data of the positional information of the zero-tree map by encoding the one-dimensional string of the nodes.

2. The method as claimed in claim 1, wherein the one-dimensional string produced from the zero-tree map is encoded by a run length encoding method.

3. A method for encoding wavelet coefficients in an image encoding method in which image data is converted and quantized into coefficients by a two-dimensional wavelet transform and the coefficients having the same spatial position are collected to form a block so as to encode the coefficients on an individual block basis, the method comprising the steps of:

defining a layered quad-tree structure of coefficients included in the block with respect to each of a set of coefficients representing a vertical component, a set of coefficients representing a horizontal component and a set of coefficients representing a diagonal component, each quartered-tree structure having a root corresponding to a coefficient of a lowest frequency band;

searching for a zero tree of which all descendant nodes lack a significant coefficient;

scanning the coefficients other than descendants of the zero tree according to a depth-first method, a scanning being separately performed for each of the set of coefficients representing the vertical component, the set of coefficients representing the horizontal component and the set of coefficients representing the diagonal component;

producing a coefficient vector by using four coefficients of each node of each quartered-tree structure and producing an EOS code at a root of the zero tree so as to produce a string of the coefficient vectors and the EOS codes; and encoding the string of the coefficient vectors and the EOS codes by a variable length encoding method.

4. The method as claimed in claim 3, wherein the set of coefficients representing the vertical component is scanned in an order of upper left, lower left, upper right and lower right; the set of coefficients representing the horizontal component is scanned in an order of upper left, upper right, lower left and lower right; and the set of coefficients representing the diagonal component is scanned in an order of upper left, lower right, upper right and lower left.

5. The method as claimed in claim 3, wherein in the encoding step the string of the coefficient vectors and the EOS codes is adaptively encoded by a variable length encoding based on a class of a degree of a value of a coefficient corresponding to a parent coefficient of the coefficient vectors or the EOS code to be encoded.

6. The method as claimed in claim 3, wherein in the encoding step the string of the coefficient vectors and the EOS codes is adaptively encoded by a variable length encoding based on a level of a frequency band in which the coefficient or the EOS code to be encoded is located.

7. The method as claimed in claim 3, wherein in the encoding step the string of the coefficient vectors and the EOS codes is adaptively encoded by a variable length encoding using a combination of a coefficient vector including a significant coefficient or an EOS code and a number of the coefficient vectors each of which lacks a significant coefficient.

* * * * *